(12) United States Patent
Kim et al.

(10) Patent No.: US 7,093,181 B2
(45) Date of Patent: Aug. 15, 2006

(54) APPARATUS AND METHOD FOR TRANSMITTING/RECEIVING ERROR DETECTION INFORMATION IN A COMMUNICATION SYSTEM

(75) Inventors: Dong-Hee Kim, Seoul (KR); Ho-Kyu Choi, Songnam-shi (KR); Youn-Sun Kim, Seoul (KR); Hwan-Joon Kwon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 383 days.

(21) Appl. No.: 10/282,429

(22) Filed: Oct. 29, 2002

(65) Prior Publication Data

US 2003/0093748 A1    May 15, 2003

(30) Foreign Application Priority Data

Oct. 29, 2001 (KR) ............... 10-2001-0066904

(51) Int. Cl.
*H03M 13/00* (2006.01)

(52) U.S. Cl. ..................... 714/758; 714/752

(58) Field of Classification Search ............ 714/758, 714/776, 781, 797, 779, 48, 746, 799, 724, 714/736, 704
See application file for complete search history.

(56) References Cited

U.S. PATENT DOCUMENTS

| | | | |
|---|---|---|---|
| 4,972,436 A | * | 11/1990 | Halim et al. ............ 375/247 |
| 5,511,073 A | | 4/1996 | Padovani et al. |
| 5,862,160 A | * | 1/1999 | Irvin et al. ............. 714/807 |

FOREIGN PATENT DOCUMENTS

WO    WO 01/03356    1/2001

OTHER PUBLICATIONS

European Search Report dated Apr. 2, 2003, issued in a counterpart application, namely, Appln. No. 02024464.6.
Daniel W. Sharp et al., "Detection of Variable Message Lengths for NATO Improved Link Eleven Using CRC Codes" Military Communications in a Changing World, McLean, VA, Nov. 4-7, 1991, Proceedings of the Military Communications Conference (MILCOM), New York, IEEE, US, vol. 2, Nov. 4, 1991, pp. 910-914.

* cited by examiner

*Primary Examiner*—Phung My Chung
(74) *Attorney, Agent, or Firm*—Dilworth & Barrese LLP

(57) ABSTRACT

Disclosed is an apparatus for generating an error detection information bit sequence for determining a length of data sequence transmitted in a communication system. The apparatus comprises a plurality of cascaded registers, the number of which is identical to the number of bits in the error detection information bit sequence, and a plurality of adders arranged on paths determined by a predetermined generator polynomial, each of the adders adding a bit sequence received through an input path to a feedback bit sequence. During reception of the control information sequence, an operator generates the feedback bit sequence by sequentially adding bits of the control information sequence to output bits of a final register and provides the generated feedback bit sequence to the adders. After completion of receiving the control information sequence, the operator sequentially adds a preset input bit to output bits of the final register and outputs the addition result as the error detection information bit sequence. An initial value controller provides the registers with a selected one of two initial values separately determined for the two data sequences.

29 Claims, 7 Drawing Sheets

APPARATUS AND METHOD FOR TRANSMITTING/RECEIVING ERROR DETECTION INFORMATION IN A COMMUNICATION SYSTEM

PRIORITY

This application claims priority to an application entitled "Apparatus and Method for Transmitting/Receiving Error Detection Information in a Communication System" filed in the Korean Industrial Property Office on Oct. 29, 2001 and assigned Serial No. 2001-66904, the contents of which are hereby incorporated by reference.

BACKGROUND OF THE INVENTION

1. Field of the Invention

The present invention relates generally to a communication system for packet data transmission, and in particular, to an apparatus and method for attaching error detection information to transmission information before transmission and reception of the transmission information.

2. Description of the Related Art

An IS-2000 CDMA (Code Division Multiple Access) mobile communication system, a typical mobile communication system, supports only a voice service. However, with the development of the communication technology and at the request of users, a future mobile communication system will support a data service as well as the voice service.

A mobile communication system supporting a multimedia service including voice and data services provides the voice service to a plurality of users, using the same frequency band. Further, the mobile communication system supports the data service by TDM (Time Division Multiplexing) or TDM/CDM (Time Division Multiplexing/Code Division Multiplexing). The TDM is a technique for assigning one code within a time slot assigned to a specific user. The TDM/CDM is a technique in which a plurality of users simultaneously use one time slot. The users are identified through unique codes (e.g., orthogonal codes such as Walsh codes) assigned to the users.

The mobile communication system includes a packet data channel (PDCH) for packet data transmission and a packet data control channel (PDCCH), e.g., secondary packet data control channel (SPDCCH), for efficient transmission of packet data. Packet data is transmitted over the packet data channel. Transmission of packet data on the air is performed in a physical layer packet (PLP) unit, and a length of the physical layer packet is varied at each transmission. The packet data control channel transmits a control information sequence needed to allow a receiver to efficiently receive the packet data. A length of the control information sequence is changed according to a length of the packet data. Therefore, the receiver can determine a varying length of the packet data by estimating a length of the control information sequence. The length of the control information sequence is estimated through blind slot detection (BSD).

FIG. 1 illustrates a structure of a packet data control channel transmitter in a mobile communication system to which the present invention is applied. Referring to FIG. 1, a packet data control channel input sequence, or a control information sequence transmitted over a packet data control channel, is assumed to have 13 bits per N slots (where N=1, 2, or 4). It should be noted that the number of bits included in the control information sequence is not related to a length of the control information sequence, and not limited to 13. A length of the control information sequence transmitted over the packet data control channel depends upon a length of the packet data. For example, if the packet data is either 1-slot length, 2-slot length, 4-slot length and, or 8-slot length, then the control information sequence has a selected one of 1-slot length, 2-slot length and 4-slot length. For the packet data having a 1-slot length, a control information sequence having a 1-slot length is transmitted. For the packet data having a 2-slot length, a control information sequence having a 2-slot length is transmitted. For the packet data having a 4-slot length, a control information sequence having a 4-slot length is transmitted. For the packet data having an 8-slot length, a control information sequence having a 4-slot length is transmitted. The reason for transmitting a control information sequence having a 4-slot length even for the packet data having an 8-slot length, is to prevent a preamble length from being excessively increased.

Error detection bits are attached by an error detection bit attacher 110 to the control information sequence transmitted over the packet data control channel. The error detection bit attacher 110 attaches the error detection bits to the control information sequence so that a receiver can detect a transmission error on the control information sequence. For example, the error detection bit attacher 110 attaches 8 error detection bits to the 13-bit control information sequence and generates a 21-bit control data sequence. A CRC (Cyclic Redundancy Code) generator is a typical example of the error detection bit attacher 110. The CRC generator generates a control data sequence, or CRC information-attached control information sequence, by encoding an input control information sequence with CRC. If the number of redundancy bits generated by the CRC generator is increased, the capability of detecting a transmission error will be increased. However, the increase in number of the redundancy bits for the control information sequence will reduce power efficiency. Therefore, 8 CRC bits are generally used for the error detection bits.

A tail bit attacher 120 attaches tail bits to the control data sequence output from the error detection bit attacher 110. A convolutional encoder 130 encodes the output of the tail bit attacher 120 with a convolutional code, and outputs coded symbols. For example, the tail bit attacher 120 attaches 8 tail bits all having 0's for convolutional encoding by the convolutional encoder 130, and outputs 29-bit information. The convolutional encoder 130 convolutional-encodes a control information sequence with a 1-slot length at a coding rate ½, and a control information sequence with a 2-slot length and a control information sequence with a 4-slot length at a coding rate ¼. The number of symbols in the control information sequence convolutional-encoded at the coding rate ¼ is two times larger than the number of symbols in the control information sequence convolutional-encoded at the coding rate ½. A symbol repeater 140 repeatedly outputs the symbols obtained by convolutional encoding the control information sequence with the 4-slot length so that the number of symbols obtained by convolutional encoding the control information sequence with a 4-slot length is two times larger than the number of symbols obtained by convolutional encoding the control information sequence with a 2-slot length. As a result, the symbol repeater 140 outputs 58N (where N=1, 2 or 4) symbols.

A puncturer 150 punctures 10N symbols among the output symbols of the symbol repeater 140 in order to minimize performance degradation and achieve proper rate matching. Therefore, the puncturer 150 outputs 48N symbols. An interleaver 160 interleaves the output symbols of the puncturer 150. The reason for using the interleaver 150 is to reduce a burst error probability by interleaving (or permuting) the order of symbols in order to solve the burst error problem caused by convolutional encoding. A bit reverse interleaver (BRI), a kind of block interleaver, can be used for the interleaver 160. The BRI increases an interval between adjacent symbols, such that the first half of the interleaved symbol sequence is comprised of even-numbered symbols and the second half of the interleaved symbol sequence is comprised of odd-numbered symbols. A modulator 170 modulates the symbols interleaved by the interleaver 160 by QPSK (Quadrature Phase Shift Keying) modulation, and generates modulated symbols for transmission.

FIG. 2 illustrates a structure of the error detection bit attacher 110 shown in FIG. 1 according to the prior art. Illustrated in FIG. 2 is an example of a CRC generator for attaching 8 CRC bits to an input control information sequence.

Referring to FIG. 2, the error detection bit attacher 110 includes a plurality of registers 211~218, a plurality of adders 221~224, switches SW1~SW3, an output adder 225, and an initial value controller 230. The initial value controller 230 initializes values of the registers 211~218 to "1" when packet data with a length of 1, 2 and 4 slots is transmitted. In contrast, the initial value controller 230 initializes values of the registers 211~218 to "0" when packet data with a length of 8 slots is transmitted. Since both a length of the control information sequence corresponding to the packet data with a 4-slot length and a length of the control information sequence corresponding to the packet data with an 8-slot length are equally 4 slots, the receiver cannot recognize a length of the packet data from the length of the control information sequence, although it estimates a length of the control information sequence. Therefore, when the error bit detection attacher 110 generates redundant bits (or error detection bits) for a control information sequence corresponding to the packet data with a 4-slot length and a control information sequence corresponding to the packet data with an 8-slot length, the initial value controller 230 sets initial values of the registers 211~218 to different values as stated above, so that the receiver can recognize through decoding whether the packet data with a 4-slot length and the packet data with an 8-slot length have been transmitted. After the values of the registers 211~218 are initialized, a binary operation is performed by the output adder 225 between each bit of the input control information sequence and a value obtained by right-shifting the values of the registers 211~218, and the operation result value is provided as an output control data sequence. During this operation, the switches SW1~SW3 are all switched to their upper terminals. After the above operation is performed on all bits of the 13-bit control information sequence, the switches SW1~SW3 are switched to their lower terminals, so the switches SW1 and SW2 are provided with a value "0." Thereafter, 8 redundant bits are attached by shifting register values as many times as the number, 8, of the redundant bit.

FIG. 3 illustrates a structure of a packet data control channel receiver according to the prior art, and FIG. 4 illustrates lengths and positions of slots used when detecting a control information sequence by the receiver of FIG. 3. In particular, FIG. 3 illustrates a structure of a receiver for detecting a length of packet data by detecting a control information sequence transmitted over a packet data control channel by BSD (Blind Slot Detection). The receiver corresponds to the packet data control channel transmitter in which a CRC generator is used as an error detection bit attacher. The receiver includes CRC checkers corresponding to the CRC generator in the transmitter.

Referring to FIG. 3, the receiver includes 4 reception processing blocks 310~340 for detecting a length of packet data. The reception processing block 310 is a block for processing a control information sequence with a 1-slot length corresponding to packet data with a 1-slot length, the reception processing block 320 is a block for processing a control information sequence with a 2-slot length corresponding to packet data with a 2-slot length, the reception processing block 330 is a block for processing a control information sequence with a 4-slot length corresponding to packet data with a 4-slot length, and the reception processing block 340 is a block for processing a control information sequence with a 4-slot length corresponding to packet data with an 8-slot length.

In the reception processing blocks 310~340, deinterleavers 312, 322, 332 and 342 perform deinterleaving as much as the corresponding slot lengths, and depuncturers 314, 324, 334 and 344 perform depuncturing according to the corresponding slot lengths. In the reception processing blocks 330 and 340 for the control information sequence with the 4-slot length, symbol combiners 335 and 345 perform symbol combining on 2 adjacent symbols, which is a reverse operation of the symbol repetition performed by the symbol repeater 140 of FIG. 1. After the depuncturing is performed in the reception processing blocks 310 and 320 and the symbol combining is performed in the reception processing blocks 330 and 340, convolutional decoders 316, 326, 336 and 346 in the reception processing blocks 310~340 perform convolutional decoding. The convolutional decoder 316 for the control information sequence with the 1-slot length convolutional-decodes an output of the depuncturer 314 at a coding rate ½. The convolutional decoder 326 for the control information sequence with the 2-slot length convolutional-decodes an output of the depuncturer 324 at a coding rate ¼. Likewise, the convolutional decoders 336 and 346 for the control information sequence with the 4-slot length convolutional-decode outputs of the symbol combiners 335 and 345 at a coding rate ¼, respectively. In final stages of the reception processing blocks 310~340, CRC checkers 318, 328, 338 and 348 are arranged. The CRC checkers 318, 328, 338 and 348 perform CRC checking on the symbols convolutional-decoded by the convolutional decoders 316, 326, 336 and 346, respectively. By the CRC checking by the CRC checkers 318, 328, 338 and 348, it is determined whether a CRC error exists in the control information sequence transmitted from the transmitter. During the CRC checking, the CRC checkers 318, 328, 338 and 348 use the initial values "1" or "0" previously determined as described in conjunction with FIG. 2. That is, the CRC checker 318 detects a CRC error by setting an initial value of a decoder register to "1," the CRC checker 328 detects a CRC error by setting an initial value of a decoder register to "1," the CRC checker 338 detects a CRC error by setting an initial value of a decoder register to "1," and the CRC checker 348 detects a CRC error by setting an initial value of a decoder register to "0." A packet length detector 350 detects a length of packet data based on the reception processing results by the reception processing blocks 310~340. Here, the 4 reception processing blocks 310~340 can be realized with either physically separated reception processing blocks or a single reception processing block using different reception parameters.

In the receiver of FIG. 3, as a result of CRC decoding, if three reception processing blocks have errors and one reception processing block has no error, it is judged that as much packet data as a length corresponding to the error-free reception processing block was transmitted. However, if it is reported that two or more reception processing blocks have no error or all reception processing blocks have no error, it is not possible to determine which control information sequence was transmitted, resulting in a failure to receive packet data.

The receiver that detects a control information sequence by the BSD, has the following problems in a process of detecting a 2-slot control information sequence and a 4-slot control information sequence corresponding to 4-slot packet data.

Referring to FIG. 1, a 2-slot control information sequence and a 4-slot control information sequence corresponding to 4-slot packet data have the same CRC register's register initial value, and are encoded by a convolutional code with a coding rate ¼. Next, the 4-slot control information sequence undergoes symbol repetition, thus doubling the number of symbols, whereas the 2-slot control information sequence does not undergo symbol repetition. Thereafter, a coded symbol sequence of the 2-slot control information sequence and a coded symbol sequence of the 4-slot control information sequence undergo puncturing and interleaving.

When the 4-slot control information sequence undergoes BRI interleaving, although the 2-slot control information sequence and the 4-slot control information sequence have different puncturing patterns, a considerable part of the symbol-repeated information is separately inserted in the first two slots and the last two slots. Therefore, if the reception processing block 320 for the 2-slot control information sequence, illustrated in FIG. 3, receives the 4-slot control information sequence transmitted, it is judged that the 4-slot control information sequence was correctly received with no CRC error. For example, when the 4-slot control information sequence is transmitted, the convolutional decoder 326 in the reception processing block 320 for the 2-slot control information sequence and the convolutional decoder 336 in the reception processing block 330 for the 4-slot control information sequence generate the same number, 10000, of decoded symbols. In other words the same CRC decoding results, at 2(1) and 4(1) of CRC success are shown in a row 4(1) of SPDCCH (CRC) in Table 1 obtained by an experiment. Accordingly, it is judged during CRC decoding that there is no error. As a result, it is not possible to determine a length of the packet data.

The same problem occurs even when the 2-slot control information sequence is transmitted. When the 2-slot control information sequence is transmitted, the reception processing block 330 for the 4-slot control information sequence receives information on the 2-slot control information sequence, combined with information on 2 previous slots or noises. Since an interleaving pattern and a puncturing patter for the 2-slot control information sequence are similar to an interleaving pattern and a puncturing pattern for the 4-slot control information sequence, it is judged that there is no error, even when CRC decoding on the 2-slot control information sequence is performed by the reception processing block 330 for the 4-slot control information sequence. For example, when the 2-slot control information sequence is transmitted, the convolutional decoder 326 in the reception processing block 320 for the 2-slot control information sequence and the convolutional decoder 336 in the reception processing block 330 for the 4-slot control information sequence generate the almost same number, 10000 and 7902, of decoded symbols. That is, almost the same CRC decoding results, at 2(1) and 4(1) of CRC success in a row 2(1) of SPDCCH (CRC) are shown in Table 1. Accordingly, it is judged during CRC decoding that there is no error. As a result, it is not possible to determine a length of the packet data.

In addition, as the outputs of the convolutional decoders 326 and 336 are identical (or nearly identical) to each other, information bits of the received control information sequence, for example, information bits indicating a user to which the control information sequence was transmitted, or retransmission-relation information bits, are also equally received at the reception processing block 320 for the 2-slot control information sequence and the reception processing block 330 for the 4-slot control information sequence. Therefore, although the information bits in the control information sequence are used, it is not possible to distinguish a slot length of the control information sequence. As a result, it is not possible to determine a length of the packet data.

Such a problem is shown in Table 1. Table 1 illustrates simulation results obtained by transmitting each of control information sequences with a slot length of 1(1), 2(1), 4(1) and 4(0) 10,000 times in a noise-free state. Here, "1" and "0" in the parenthesis indicate initial values to which all registers in the CRC generator are initialized. The result values obtained through the computer simulation include a successful detection probability Pd, a false probability Pfa of recognizing an incorrect slot length as a correct slot length, a mis-probability Pm of mistaking a correct slot length for an incorrect slot length, and an error probability Pe, the sum of the false probability Pfa and the mis-probability Pm. It is noted in Table 1 that the error probability Pe in detecting a control information frame comprised of 2(1) slots and 4(1) slots is abnormally high.

TABLE 1

| SPDCCH (CRC) | Pd | Pfa | Pm | Pe |
|---|---|---|---|---|
| 1(1) | 9.881e−01 | 0.000e+00 | 1.190e−02 | 1.190e−02 |
| 2(1) | 2.081e−01 | 0.000e+00 | 7.919e−01 | 7.919e−01 |
| 4(1) | 0.000e+00 | 0.000e+00 | 1.000e+00 | 1.000e+00 |
| 4(0) | 9.963e−01 | 0.000e+00 | 3.700e−03 | 3.700e−03 |

| SPDCCH (CRC) | CRC success | | | | Dedicated to other CRC symbols | | | |
|---|---|---|---|---|---|---|---|---|
| | 1(1) | 2(1) | 4(1) | 4(0) | 1(1) | 2(1) | 4(1) | 4(0) |
| 1(1) | 10000 | 40 | 43 | 38 | 0 | 40 | 43 | 38 |
| 2(1) | 34 | 10000 | 7902 | 5 | 34 | 0 | 7 | 5 |
| 4(1) | 47 | 10000 | 10000 | 0 | 47 | 0 | 0 | 0 |
| 4(0) | 37 | 0 | 0 | 10000 | 37 | 0 | 0 | 0 |

SUMMARY OF THE INVENTION

It is, therefore, an object of the present invention to provide an apparatus and method for attaching error detection information to transmission information in a communication system.

It is another object of the present invention to provide an apparatus and method for attaching corresponding error detection information to transmission information blocks having different lengths in a communication system.

It is further another object of the present invention to provide an apparatus and method for attaching error detection information to control information of packet data in a communication system for transmitting the packet data.

It is yet another object of the present invention to provide an apparatus and method for receiving control information of packet data and analyzing the received control information in a communication system for transmitting the packet data.

It is still another object of the present invention to provide a control information frame transceiver apparatus and method for efficiently estimating a length of a control information frame transmitted over a packet data control channel by BSD (Blind Slot Detection) in a communication system for transmitting packet data.

According a first aspect of the present invention, there is provided an apparatus for generating an error detection information bit sequence for determining a length of data sequence transmitted. The apparatus is applied in a communication system which can transmit at least two data sequences with different lengths through a data channel, and transmit through a data control channel a control data sequence with the same length as the data sequences. The control data sequence includes a control information sequence indicating information with regard to each data sequence and an error detection information bit sequence for detecting an error of the control information sequence. The apparatus further comprises a plurality of cascaded registers, the number of the registers being identical to the number of bits in the error detection information bit sequence. A plurality of adders are arranged on paths determined by a predetermined generator polynomial among paths between the registers. Each of the adders add a bit sequence received through an input path to a feedback bit sequence and output the addition result through an output path. An operator is provided for generating, during reception of the control information sequence, the feedback bit sequence by sequentially adding bits of the control information sequence to output bits of a final register among the registers and provides the generated feedback bit sequence to the adders. After completion of receiving the control information sequence, the operator sequentially adds a preset input bit to output bits of the final register and outputs the addition result as the error detection information bit sequences. An initial value controller provides the registers with a selected one of two initial values separately determined for the two data sequences.

According to a second aspect of the present invention, there is provided an apparatus for generating a transmission information sequence by attaching an error detection information bit sequence to an input information sequence of a first information sequence or a second information sequence. The apparatus is applied in a communication system which encodes a first information sequence with a first length at a predetermined coding rate before transmission, or encodes a second information sequence with a second length being F times (where, F is a multiple of 2) the first length at the predetermined coding rate before F-time repeated transmission. The apparatus comprises a plurality of cascaded registers, the number of the registers being identical to the number of bits in the error detection information bit sequence. A plurality of adders are arranged on paths determined by a predetermined generator polynomial among paths between the registers. Each of the adders add a bit sequence received through an input path to a feedback bit sequence and output the addition result through an output path. An operator is provided for generating, during reception of the input information sequence, the feedback bit sequence by sequentially adding bits of the input information sequence to output bits of a final register among the registers, providing the generated feedback bit sequence to the adders, and outputting the input information sequence as the transmission information sequence. After completion of receiving the input information sequence, the operator provides a preset input bit to the adders, sequentially adds the preset input bit to output bits of the final register thus to generate an error detection information bit sequence, and outputs the error detection information bit sequence as the transmission information sequence. An initial value controller for provides the registers with a selected one of two initial values separately determined for the first information sequence and the second information sequence.

According to a third aspect of the present invention, there is provided an apparatus for checking an error of a received control data sequence to detect a length of data sequences transmitted over a data channel. The apparatus is applied in a communication system including a transmitter which can transmit at least two data sequences with different lengths through the data channel and transmit through a data control channel a control data sequence with the same length as the data sequences. The control data sequence has a control information sequence indicating information with regard to each data sequence and an error detection information bit sequence for detecting an error in the control information sequence. The communication system also includes a receiver which receives data sequences transmitted over the data channel from the transmitter and a control data sequence transmitted over the data control channel from the transmitter. The apparatus comprises a plurality of cascaded registers, the number of the registers being identical to the number of bits in the error detection information bit sequence. A plurality of adders are arranged on paths determined by a predetermined generator polynomial among paths between the registers. Each of the adders add a bit sequence received through an input path to a feedback bit sequence and output the addition result through an output path. An operator is provided for generating, during reception of the control information sequence, the feedback bit sequence by sequentially adding bits of the control information sequence to output bits of a final register among the registers and providing the generated feedback bit sequence to the adders. After completion of receiving the control information sequence, the operator sequentially adds a preset input bit to output bits of the final register and outputs the addition result as a received error detection information bit sequence. An initial value controller provides the registers with a selected one of two initial values separately determined for the two data sequences. An error decision block compares the received error detection information bit sequence with an error detection information bit sequence corresponding to the selected initial value, thus to determine existence of an error.

According to a fourth aspect of the present invention, there is provided an apparatus for checking an error of a received information sequence in a communication system including a transmitter which encodes a first information sequence with a first length at a predetermined coding rate before transmission, or encodes a second information sequence with a second length being F times (where, F is a multiple of 2) the first length at the predetermined coding rate before F-time repeated transmission. The transmitter further attaches an error detection information bit sequence to the first information sequence or the second information sequence and transmits the result as a transmission information sequence. The communication system also includes a receiver which receives an information sequence from the transmitter. The apparatus comprises a plurality of cascaded registers, the number of the registers being identical to the number of bits in the error detection information bit sequence. A plurality of adders are arranged on paths determined by a predetermined generator polynomial among paths between the registers. Each of the adders add a bit sequence received through an input path to a feedback bit sequence and output the result through an output path. An operator is provided for generating, during reception of the received information sequence, the feedback bit sequence by sequentially adding bits of the received information sequence to output bits of a final register among the registers and, providing the generated feedback bit sequence to the adders. After completion of receiving the received information sequence, the operator provides a preset input bit to the adders, sequentially adds the preset input bit to output bits of the final register and outputs the addition result as a received error detection information bit sequence. An initial value controller provides the registers with a selected one of two initial values separately determined for the first information sequence and the second information sequence. An error decision block compares the received error detection information bit sequence with an error detection information bit sequence corresponding to the selected initial value, thus to determine existence of an error.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

In the following description, the present invention provides a packet data control channel transceiver for transmitting and receiving control data for controlling packet data sequences in a mobile communication system for transmitting at least two packet data sequences having different lengths. It will be assumed herein that the control data includes a control information sequence (e.g., preamble) indicating information with regard to transmission packet data, and the packet data control channel is a secondary packet data control channel (SPDCCH). A transmitter according to an embodiment of the present invention includes an error detection information attacher for attaching an information bit sequence for error detection to the control information sequence before transmission so that a receiver can determine whether the transmitted control data is correctly received. In the embodiment of the present invention, a CRC (Cyclic Redundancy Code) generator is typically used as the error detection information attacher. A receiver according to an embodiment of the present invention is a BSD (Blind Slot Detection) receiver for receiving control data transmitted from the transmitter and determining a length of packet data based on the received control data. The transmitter and the receiver according to an embodiment of the present invention can be applied not only to the mobile communication system but also to a communication system for transmitting a data sequence including (i) a control information sequence indicating information with regard to data transmitted for efficient transmission of the data sequence and a data transmission format, and (ii) an error detection information bit sequence for detecting an error of the control information sequence.

Figure 3:
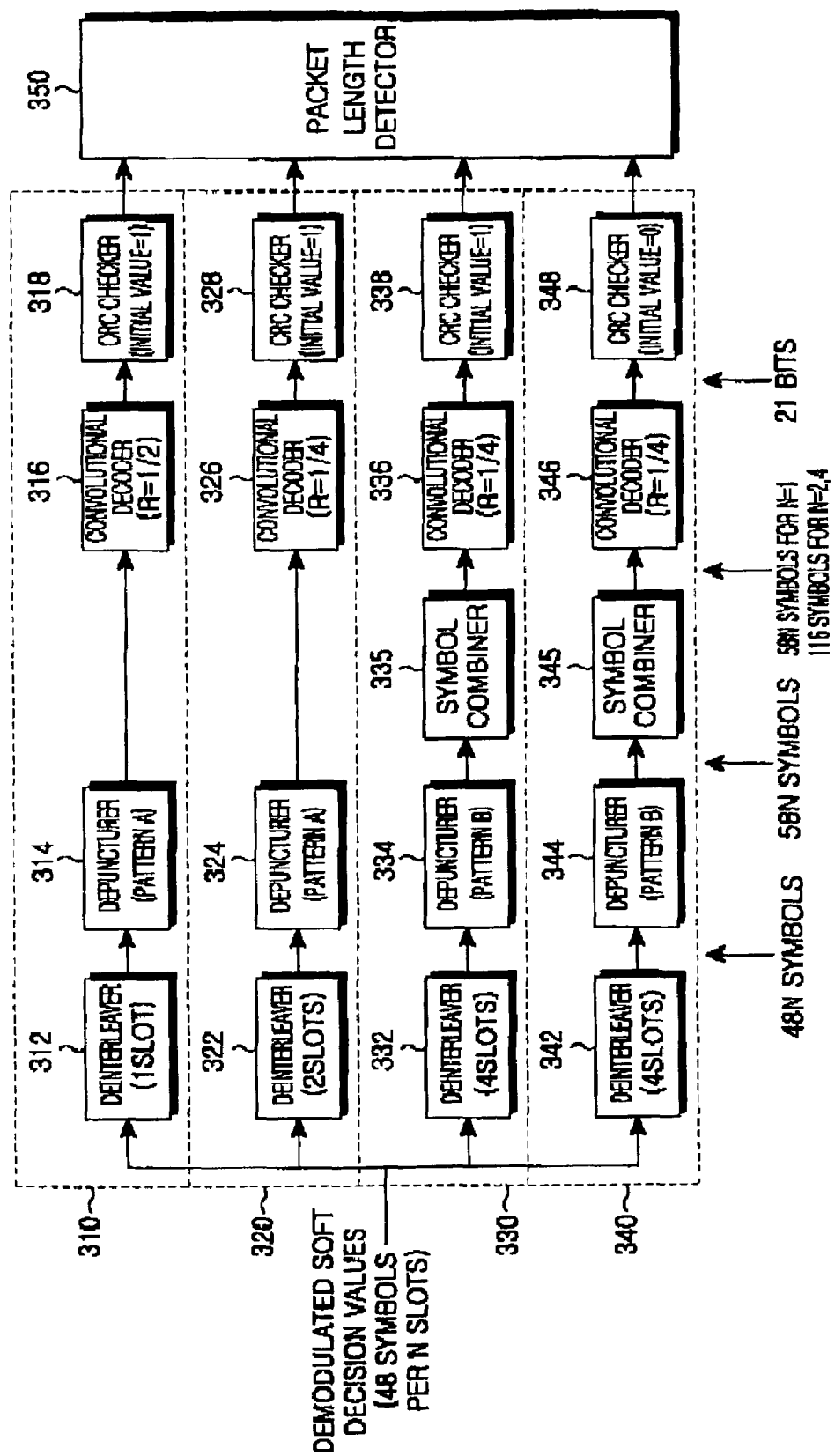
FIG. 3 illustrates a structure of a packet data control channel receiver according to the prior art.

In order to distinguish control information sequences (or control information frames) with different lengths caused by the structural problem of the conventional packet data control channel, a preferred embodiment of the present invention provides an improved CRC generator and a BSD receiver for correcting an error generated in a control information frame received by BSD. The embodiment of the present invention sets different register initial values of the CRC generator not only in control information frames with the same length but also in control information frames with different lengths, thus to correct an error generated in a control information frame received by BSD. That is, contrary to the prior art where the outputs of the convolutional decoders become identical to one another in the reception processing blocks for the control information frames with different lengths as shown, for example, in FIG. 3, the present invention sets different initial values of the registers of the CRC generator so that only one reception processing block can judge that the CRC decoder has no error, thereby making it possible to determine a length of a control information frame.

The terms "control information frame", "error detection bit", "control information" and "packet data" used in the specification corresponds to "control information sequence", "error detection information sequence", "control data sequence" and "data sequence", respectively as used, for example, in the claims.

Figure 1:
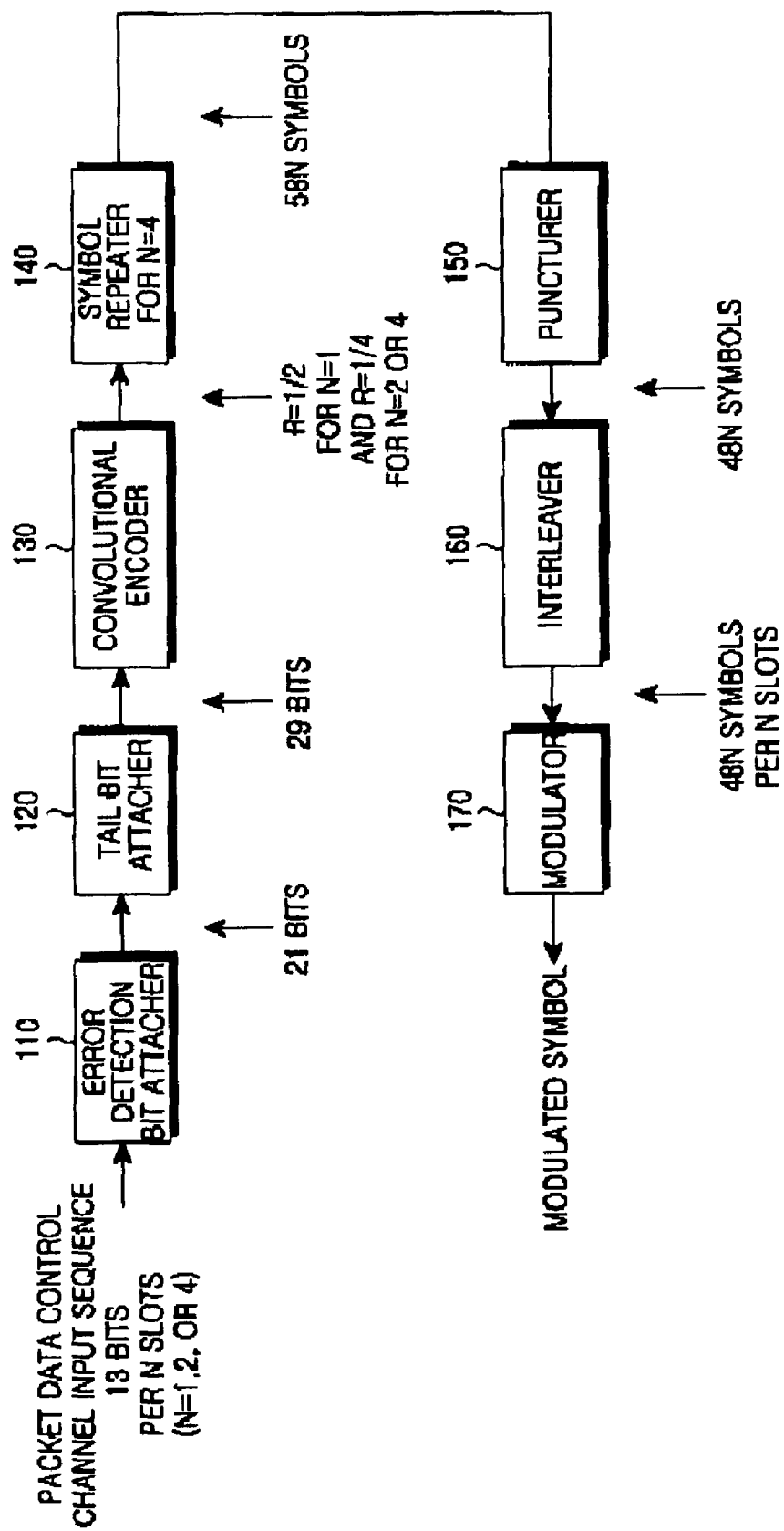
FIG. 1 illustrates a structure of a packet data control channel transmitter in a mobile communication system to which the present invention is applied.
Figure 2:
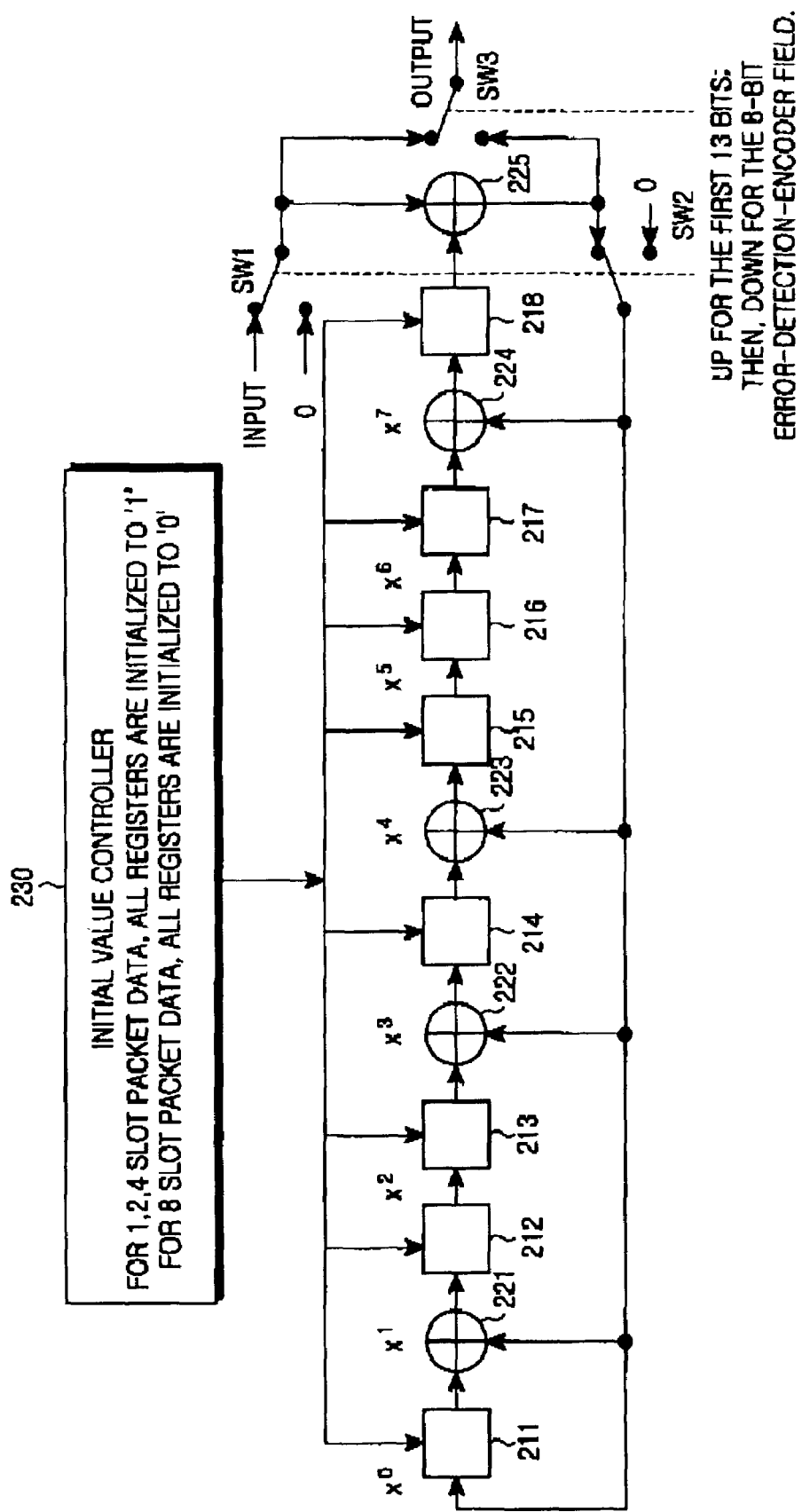
FIG. 2 illustrates a structure of the error detection bit attacher shown in FIG. 1 according to the prior art.
Figure 5:
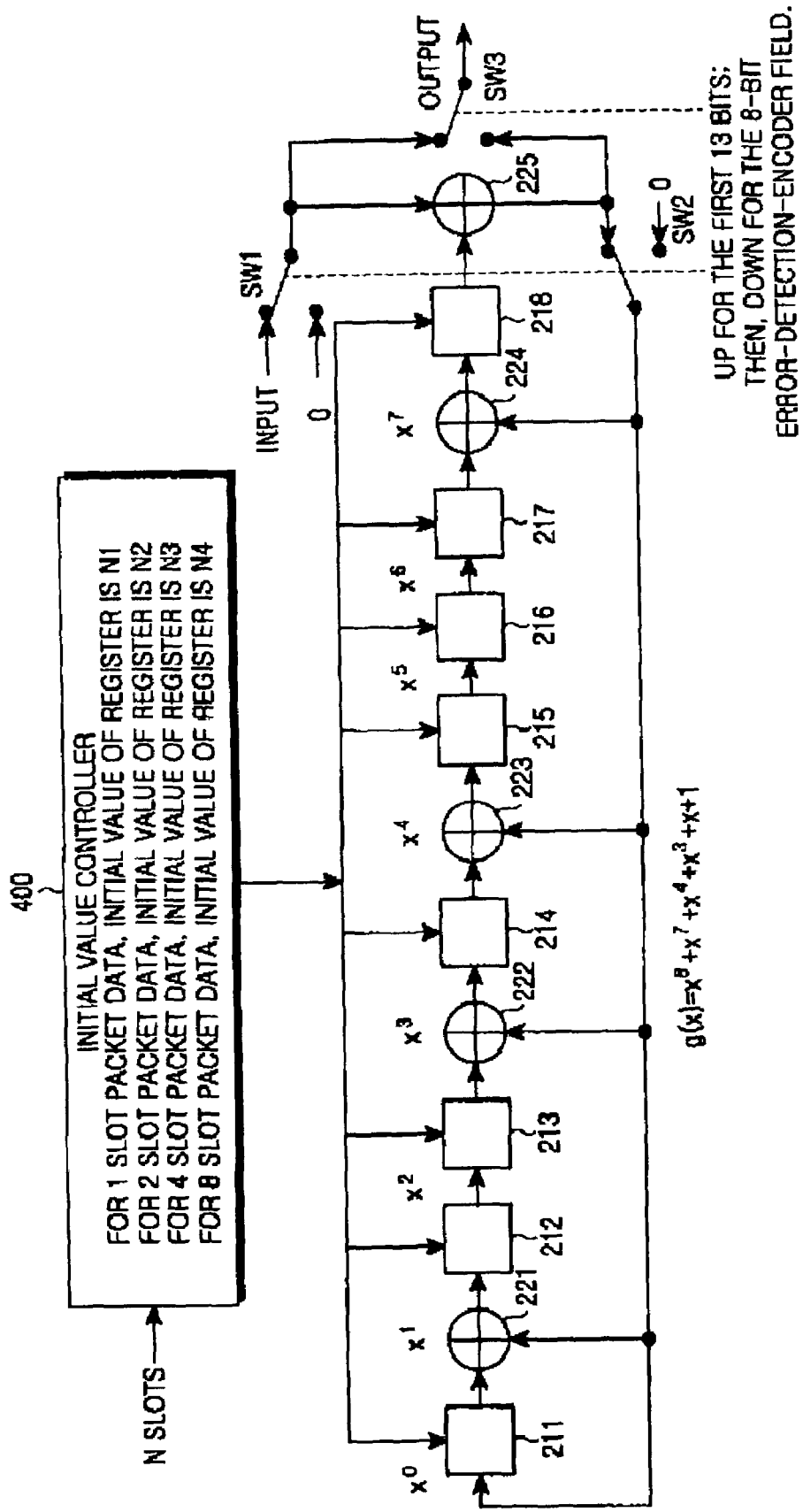
FIG. 5 illustrates a structure of an error detection information attacher according to an embodiment of the present invention.

FIG. 5 illustrates a structure of an error detection information attacher according to an embodiment of the present invention. The error detection information attacher constitutes the error detection bit attacher 110 of FIG. 1, and replaces to the CRC generator illustrated in FIG. 2. The CRC generator of FIG. 2 sets different initial values of the registers thereof only when control information frames have the same length, i.e., when a control information frame for 4-slot packet data and a control information frame for 8-slot packet data both have a length of 4 slots. However, the CRC generator according to the present invention as shown in FIG. 5 sets different initial values of the registers for control information frames of the control channel supporting packet data with different lengths regardless of a length of a control information frame. For example, when 8 error detection bits are attached to a control information frame, 8 registers constituting the CRC generator are arbitrarily set to "1" or "0." When the initial values are expressed in a decimal number, the 8 registers are set to a decimal initial value between 0 and 255 (=$2^8$–1). That is, if the number of registers constituting the CRC generator (or the number of redundant information bits for error detection) is defined as "m," initial values of the registers in the CRC generator can be set to a decimal value between 0 and $2^m$–1. For example, initial values N1, N2, N3 and N4 of registers in the CRC generator, to be used when transmitting a 1-slot control information frame for 1-slot packet data, a 2-slot control information frame for 2-slot packet data, a 4-slot control information frame for 4-slot packet data, and a 4-slot control information frame for 8-slot packet data, respectively, can be set to a value between 0 and 255. N1, N2, N3 and N4 can be set to different values. Alternatively, N1 can be set to the same value as N2, N3 or N4. This is because it is allowable to set only N2 and N3, which were at issue in the conventional CRC generator, to different values. Of course, the N1~N4 values may be set to a fixed value.

Referring to FIG. 5, the error detection information attacher according to an embodiment of the present invention includes a plurality of registers 211~218, a plurality of adders 221~224, switches SW1~SW3, an output adder 225, and an initial value controller 400. The initial value controller 400 initializes values of the registers 211~218 to N1 when packet data with a 1-slot length is transmitted. The initial value controller 400 initializes values of the registers 211~218 to N2 when packet data with a 2-slot length is transmitted. The initial value controller 400 initializes values of the registers 211~218 to N3 when packet data with a 4-slot length is transmitted. The initial value controller 400 initializes values of the registers 211~218 to N4 when packet data with an 8-slot length is transmitted.

After the values of the registers 211~218 are initialized, a binary operation (or exclusive OR operation or modulo-2 operation) is performed by the output adder 225 between each bit of the input control information sequence and a value finally obtained from the register 218 by right-shifting the values of the registers 211~218, and the operation result value is generated as a feedback bit sequence. The generated feedback bit sequence is provided as an input of the initial register 211 among the registers 211~218 and an input of the adders 221~224. During this operation, the switches SW1~SW3 are all switched to their upper terminals. After the above operation is performed on all bits of the 13-bit control information sequence, the switches SW1~SW3 are switched to their lower terminals, so the switches SW1 and SW2 are provided with a value "0." Thereafter, 8 redundant bits are attached by shifting register values as many times as the number, 8, of the redundant bit.

The error detection information attacher according to an embodiment of the present invention is designed to solve the problems of the conventional CRC generator. That is, even when a control information frame with a 2-slot length indicating transmission of packet data with a 2-slot length is transmitted and a control information frame with a 4-slot length indicating transmission of packet data with a 4-slot length is transmitted, the receiver can detect a length of a control information frame and a length of the transmitted packet data through normal error detection. Therefore, the error detection information attacher will be described with reference to FIGS. 1 and 5.

In a communication system which encodes (or convolutional-encodes) first information with a first length (e.g., packet data with a 2-slot length) at a predetermined coding rate (e.g., a coding rate ¼) before transmission, or encodes second information with a second length being F times the first length (e.g., packet data with a 4-slot length) at the predetermined coding rate before F-time repeated transmission, the error detection information attacher according to an embodiment of the present invention attaches error detection information to the first information or the second information. The error detection information attacher includes the initial value controller 400 and an error detection information generator. The error detection information generator is comprised of a plurality of registers 211~218, a plurality of adders 221~224, a first switch SW1, a second switch SW2, a third switch SW3, an output adder 225.

The initial value controller 400 receives information on a length (N slots) of transmission packet data, and provides the registers 211~218 with proper initial values according to the information on a length of the transmission packet data. For example, the initial value controller 400 provides a first initial value during transmission of the first information and provides a second initial value during transmission of the second information. The first initial value and the second initial value are determined within a range of a value corresponding to the number of the error detection information bits. If the number of error detection information bits is defined as m, the first initial value and the second initial value are different values determined within a range of $2^m$–1.

The error detection information generator includes a plurality of cascaded registers 211~218, the number of which is identical to the number of the error detection information bits. The error detection information generator initializes the registers 211~218 to the corresponding initial values provided from the initial value controller 400 before transmitting transmission information of the first information and the second information. In addition, the error detection information generator sequentially shifts the registers 211~218 while transmitting the transmission information. The sequentially shifted bits output from the final register 218 among the registers 211~218 are added by the output adder 225 to bits of the transmission information. The output bits of the output adder 225 are provided to the initial register 211 and the adders 211~224 as a feedback bit sequence through the second switch SW2. In addition, the error detection information generator sequentially shifts the registers 211~218 after completing transmission of the transmission information. At this point, an output value of the final register 218 is generated as the error detection information to be attached to the transmission information, through the third switch SW3.

The registers 211~218 include the initial register 211, intermediate registers 212~217 and the final register 218, each of which has a signal input terminal, a signal output terminal, and an initial value input terminal connected to receive an initial value from the initial value controller 400. The initial register 211, the intermediate registers 212~218 and the final register 218 are cascaded thorough their input paths and output paths. Output values of the registers 211, 213, 214 and 217 corresponding to predetermined paths among the paths of the registers 211~218 are added to an output value of the output adder 225 or a preset value (e.g., "0") by the adders 221~224, respectively, and then provided to their succeeding registers 212, 214, 215 and 218. Positions of the adders 221~224 are so determined as to satisfy a predefined generator polynomial for generating CRC (Cyclic Redundancy Check) information. Herein, the CRC information has 8 bits, and the generator polynomial is $g(x)=x^8+x^7+x^4+x^3+x+1$.

When the transmission information is transmitted, the output adder 225 in the error detection information generator adds each bit of the transmission information to the output value of the final register 218, and provides its output to the signal input terminals of the initial register 211 and the adders 221~224 as a feedback bit sequence. When transmission of the transmission information is completed, the output adder 225 adds the output value of the final register 218 to the preset value "0" and provides its output as the error detection information. For this operation, the switches SW1~SW3 are provided.

The first switch SW1 has a first input terminal for receiving the transmission information, a second input terminal for receiving the preset value "0," and an output terminal connected to a first input terminal of the output adder 225. The first switch SW1 selects the transmission information received through the first input terminal or the preset value "0" received through the second input terminal, and outputs the selected value through the output terminal. The second switch SW2 has a first input terminal connected to an output terminal of the output adder 225, a second input terminal for receiving the preset value "0," and an output terminal connected to an input terminal of the initial register 211 and adders 221–224. The second switch SW2 selects the output of the output adder 225 received through the first input terminal or the preset value "0" received through the second input terminal, and outputs the selected value through the output terminal. The third switch SW3 has a first input terminal connected to the output terminal of the first switch, a second input terminal connected to the output terminal of the output adder 225, and an output terminal for outputting the transmission information and the error detection information. The third switch SW3 selects the transmission information or the preset value "0" received through the first input terminal or the output of the output adder 225 received through the second input terminal, and outputs the selected value through the output terminal. However, a construction of a register is also made in a method differing from the method embodied in FIG. 5 and the register and the adder can be implemented without physically embodying them, which is obvious to a person skilled in the art.

The output adder 225 and the switches SW1~SW3 constitute an operator for performing the following operation. The operator, while receiving an input information sequence, generates the feedback bit sequence by sequentially adding bits of the input information sequence to output bits of the final register 218 by the output adder 225, provides the generated feedback bit sequence to the adders 221~224, and outputs the input information sequence as a transmission information sequence through the third switch SW3. Further, the operator, after completing reception of the input information sequence, sequentially adds the preset value "0" to output bits of the final register 218 by the output adder 225, and outputs the addition result by the output adder 225 as an error detection information bit sequence through the third switch SW3.

Figure 4:
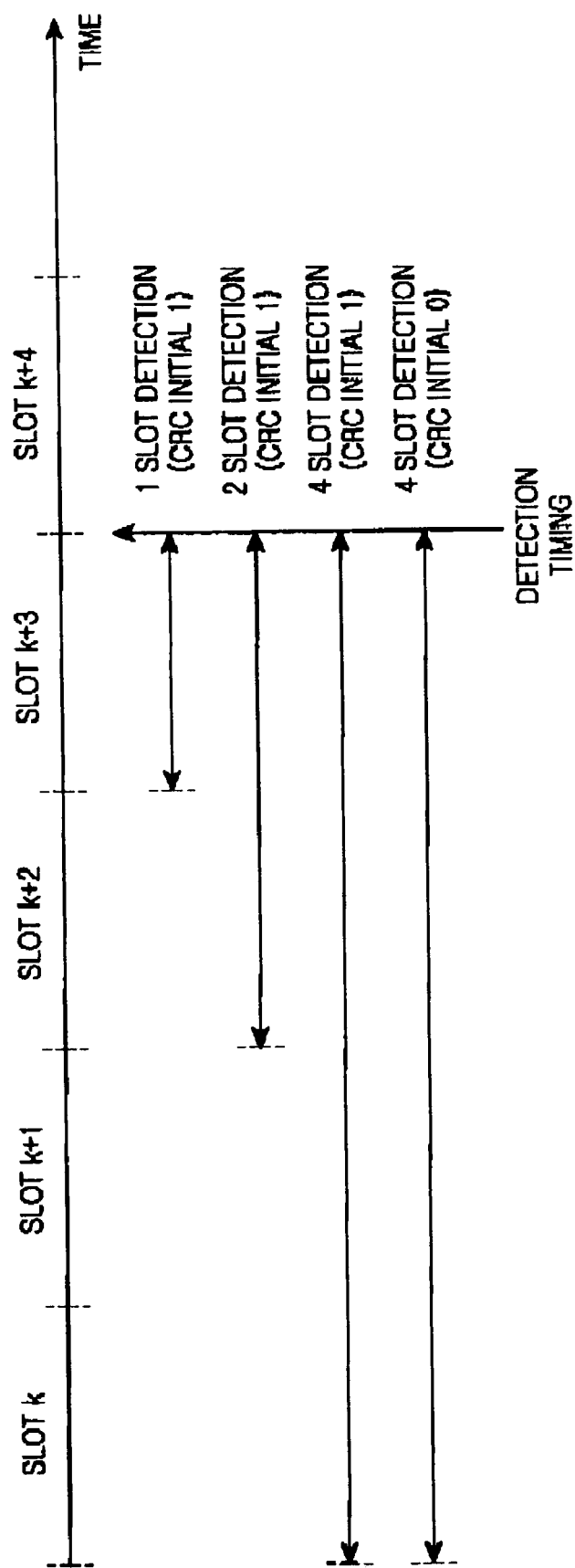
FIG. 4 illustrates lengths and positions of slots used when detecting a control information sequence by the receiver of FIG. 3.
Figure 6:
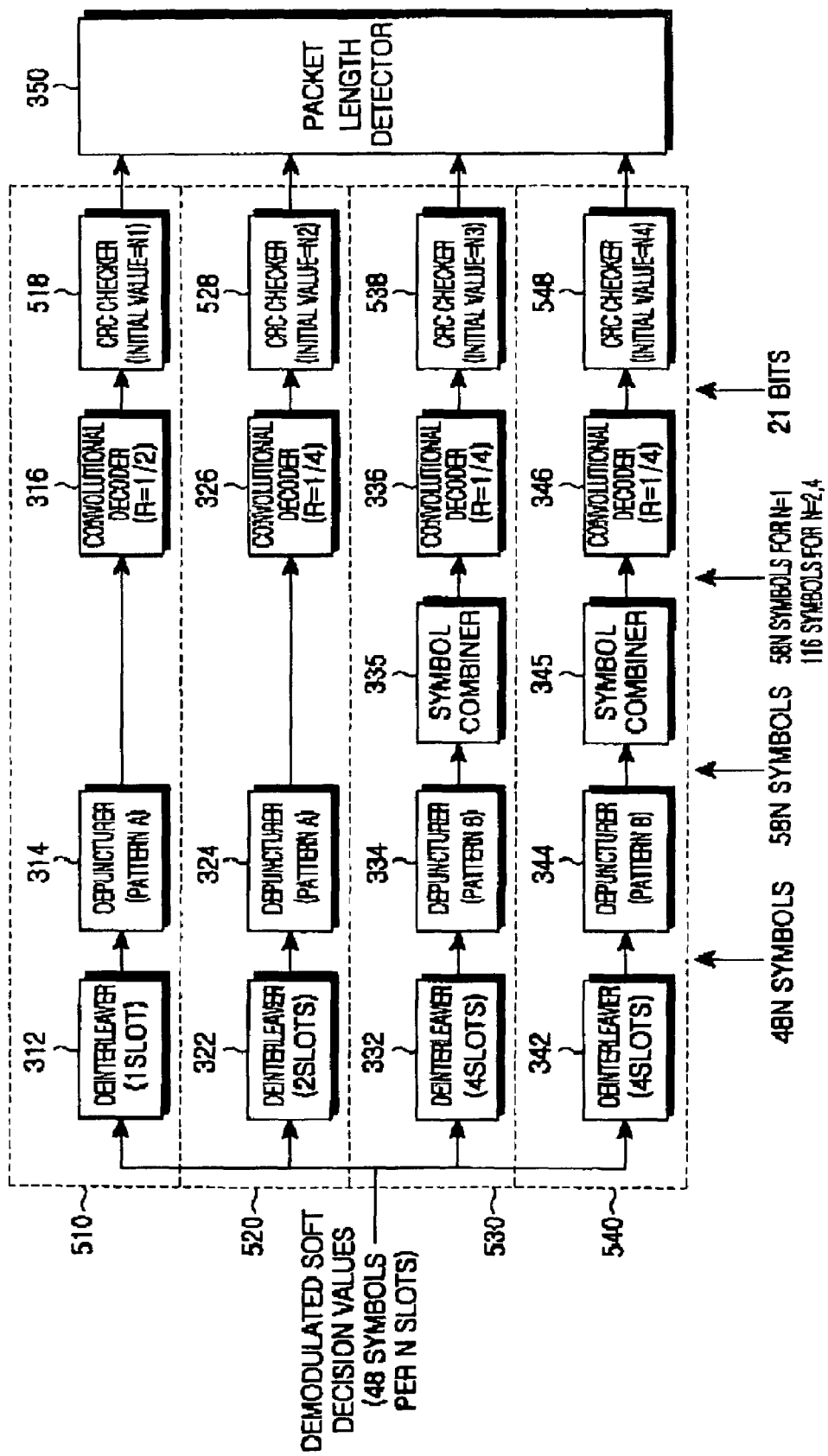
FIG. 6 illustrates a structure of a packet data control channel receiver according to an embodiment of the present invention.

FIG. 6 illustrates a structure of a packet data control channel receiver according to an embodiment of the present invention. This receiver is identical in structure to the BSD receiver illustrated in FIG. 3, but different from the BSD receiver in that register initial values of the CRC generator are set by CRC checkers in accordance with the present invention. That is, the receiver according to an embodiment of the present invention is characterized in that 4 reception processing blocks use different CRC generator register initial values when performing CRC checking. The receiver is based on BSD. Here, the "BSD" refers to a technique for detecting a length of transmitted packet data by estimating in a slot unit a received control information frame for the packet data transmitted from a transmitter. For example, as illustrated in FIG. 4, it is determined in a $(k+3)^{th}$ slot whether a 1-slot control information frame has been received, and it is determined in a $(k+2)^{th}$ slot whether a 2-slot control information frame has been successively received from the previous $(k+3)^{th}$ slot. It is determined in a $k^{th}$ slot whether a 4-slot control information frame for 4-slot packet data or a 4-slot control information frame for 8-slot packet data has been successively received from the previous $(k+3)^{th}$ slot, $(k+2)^{th}$ slot and $(k+1)^{th}$ slot. During the operation of detecting the control information frames, error detection information (CRC information) is checked, and initial values used for CRC checking on each control information frame are set to N1, N2, N3 and N4 as described in conjunction with FIG. 5.

Referring to FIG. 6, the receiver includes 4 reception processing blocks 510~540 in order to detect a length of packet data transmitted from the receiver. The reception processing blocks 510~540, after receiving an input signal, determines where a CRC error exists in the received input signal, thereby to determine a length of packet data. Here, the received input signal, comprised of demodulated soft decision values, is a control information frame having a length determined according to the number of information bits of packet data that can be transmitted by the transmitter. Here, a typical example of the information bits is 13-bit information on SPDCCH, and the 13-bit information includes 6-bit MAC (Medium Access Control) ID (Identifier), 2-bit ARQ (Automatic Response Request) channel ID, 3-bit encoder packet size, and 2-bit sub-packet ID. The reception processing block 510 is a block for processing a control information frame with a 1-slot length corresponding to packet data with a 1-slot length, the reception processing block 520 is a block for processing a control information frame with a 2-slot length corresponding to packet data with a 2-slot length, the reception processing block 530 is a block for processing a control information frame with a 4-slot length corresponding to packet data with a 4-slot length, and the reception processing block 540 is a block for processing a control information frame with a 4-slot length corresponding to packet data with an 8-slot length.

In the reception processing blocks 510~540, deinterleavers 312, 322, 332 and 342 perform deinterleaving as much as the corresponding slot lengths, and depuncturers 314, 324, 334 and 344 perform depuncturing according to the corresponding slot lengths. In the reception processing blocks 530 and 540 for the control information frame with the 4-slot length, symbol combiners 335 and 345 perform symbol combining on 2 adjacent symbols, which is a reverse operation of the symbol repetition performed by the symbol repeater 140 of FIG. 1. After the depuncturing is performed in the reception processing blocks 510 and 520 and the symbol combining is performed in the reception processing blocks 530 and 540, convolutional decoders 316, 326, 336 and 346 in the reception processing blocks 510~540 perform convolutional decoding. The convolutional decoder 316 for the control information frame with the 1-slot length convolutional-decodes an output of the depuncturer 314 at a coding rate ½. The convolutional decoder 326 for the control information frame with the 2-slot length convolutional-decodes an output of the depuncturer 324 at a coding rate ¼. Likewise, the convolutional decoders 336 and 346 for the control information frame with the 4-slot length convolutional-decode outputs of the symbol combiners 335 and 345 at a coding rate ¼, respectively.

Figure 7:
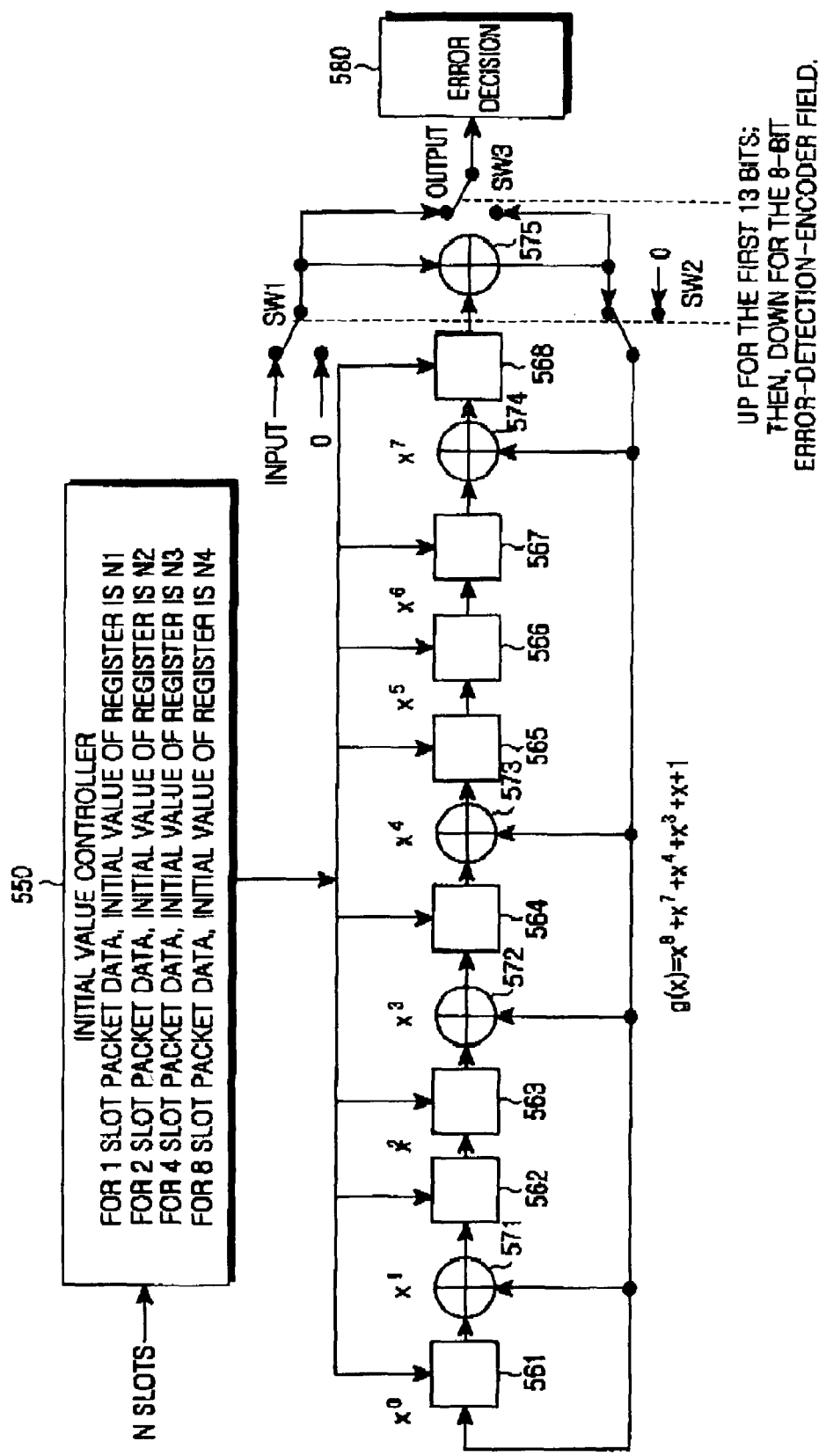
FIG. 7 illustrates a structure of an apparatus for detecting an error in received bits according to an embodiment of the present invention.

In final stages of the reception processing blocks 510~540, CRC checkers 518, 528, 538 and 548 are arranged. The CRC checkers 518, 528, 538 and 548 perform CRC checking on the symbols convolutional-decoded by the convolutional decoders 316, 326, 336 and 346, respectively. By the CRC checking by the CRC checkers 318, 328, 338 and 348, it is determined whether a CRC error exists in the control information frame transmitted from the transmitter. Although separate CRC checkers are separately included in the reception processing blocks in FIG. 6, it would be obvious to those skilled in the art that the reception processing blocks can share a single CRC checker using different register initial values as illustrated in FIG. 7. During the CRC checking, the CRC checkers 518, 528, 538 and 548 use predetermined initial values provided from the initial value controller 400 as described in conjunction with FIG. 5. That is, the CRC checker 518 detects a CRC error by setting an initial value of a decoder register to Ni, the CRC checker 528 detects a CRC error by setting an initial value of a decoder register to N2, the CRC checker 538 detects a CRC error by setting an initial value of a decoder register to N3, and the CRC checker 548 detects a CRC error by setting an initial value of a decoder register to N4. A packet length detector 350 detects a length of packet data based on the reception processing results by the reception processing blocks 510~540. Here, the four reception processing blocks 510~540 can be realized with either physically separated reception processing blocks or a single reception processing block using different reception parameters.

FIG. 7 illustrates a structure of an apparatus for detecting an error in received bits according to an embodiment of the present invention. The error detection apparatus corresponds to the error detection bit generator illustrated in FIG. 5, and has the same operation as the error detection bit generator except that received bits are applied to an input terminal of the first switch SW1. The error detection apparatus according to an embodiment of the present invention is designed to solve the problems of the conventional receiver. That is, even when a control information frame with a 2-slot length indicating transmission of packet data with a 2-slot length is received and a control information frame with a 4-slot length indicating transmission of packet data with a 4-slot length is received, the receiver can accurately detect a length of a control information frame and a length of the transmitted packet data through normal error detection.

Referring to FIG. 7, the error detection apparatus according to an embodiment of the present invention is designed to detect an error in received bits in the receiver which receives information transmitted from a transmitter which attaches, before transmission, error detection information to transmission information (e.g., a control information frame of packet data) of first information with a first length (e.g., a control information frame with a 2-slot length) or second information with a second length being F times (e.g., 2 times) the first length (e.g., a control information frame with a 4-slot length). The error detection apparatus includes a plurality of registers 561~568, a plurality of adders 571~574, an output adder 575, switches SW1~SW3, an initial value controller 550, and an error decision block 580.

The initial value controller 550 provides a first initial value for the first information and provides a second initial value for the second information in order to initialize the registers. The provided initial values are determined according to the various lengths (N slots) of the packet data. Preferably, the first initial value and the second initial value are determined within a range of a value corresponding to the number of the attached error detection information bits.

The registers 561~568, the number of which is identical to the number of the attached error detection information bits, are cascaded and initialized to corresponding initial values provided from the initial value controller 550. The adders 571~574 are arranged on paths determined by a predetermined generator polynomial among the paths between the registers 561~568. Each of the adders 571~574 adds an input bit sequence received through an input path to a feedback bit sequence, and provides its output through an output path. The feedback bit sequence refers to a bit sequence output from the output adder 575.

The output adder 575 and the switches SW1~SW3 constitute an operator for performing the following operation. The operator, while receiving a received information sequence (the first information or second information), generates the feedback bit sequence by sequentially adding bits of the received information sequence to output bits of the final register 568, and provides the generated feedback bit sequence to the adders 571~574 and the initial register 561 through the second switch SW2. Further, the operator, after completing reception of the received information sequence, provides the preset input bit "0" to the adders 571~574 and the initial register 561 through the first switch SW1, sequentially adds the preset input bit "0" to output bits of the final register 568 by the output adder 575, and outputs the addition result as a received error detection information bit sequence.

The first switch SW1 selects the received information sequence or the preset input bit "0." The first switch SW1 outputs the received information sequence while receiving the received information sequence, and outputs the preset input bit "0" after completion of receiving the received information sequence. The output adder 575 adds an output of the first switch SW1 to output bits of the final register 568. The second switch SW2 selects the output of the output adder 575 or the preset input bit "0," and provides the selected value to the adders 571~574 and the initial register 561, as a feedback bit sequence. The second switch SW2 provides the output of the output adder 575 to the adders 571~574 and the initial register 561 during reception of the received information sequence, and provides the preset input bit "0" to the adders 571~574 and the initial register 561 after completing reception of the received information sequence. The third switch SW3 selects the received information sequence or the output bit sequence, i.e., the received error detection information bit sequence, of the output adder 575. The third switch SW3 outputs the received information sequence during reception of the received information sequence, and outputs the received error detection information bit sequence provided from the output adder 575 after completing reception of the received information sequence.

The error decision block 580 compares the received error detection information bit sequence with an error detection information bit sequence corresponding to the selected initial value, thus to determine whether an error exists in the received bits. That is, the error decision block 580 decides that no error exists in the received bits, if the received error detection information bit sequence is identical to the error detection information bit sequence corresponding to the selected initial value. Otherwise, if the received error detection information bit sequence is not identical to the error detection information bit sequence corresponding to the selected initial value, the error decision block 580 decides that an error exists in the received bits. Based on the decision result by the error decision block 580, the packet length detector 350 of FIG. 6 can detect a length of the received bits.

As described above, in the error detection apparatus of FIG. 7, the initial value controller 550 operates according to a length of the packet data. When first 13 bits of the received bits transmitted from the transmitter are completely received, the switches SW1~SW3 are switched to their lower terminals, so the switches SW1 and SW2 are provided with the preset input bit "0." Thereafter, 8 error detection bits (or redundant bits) are generated by shifting register values as many times as the number, 8, of the error detection bits. The error detection block 580 compares error detection bits (attached by the transmitter) included in the received bits with newly generated error detection bits. The error detection block 580 decides that no error exists in the received bits, if the error detection bits included in the received bits are identical to the newly generated error detection bits. However, if the error detection bits included in the received bits are not identical to the newly generated error detection bits, the error detection block 580 decides that an error exists in the received bits. Although the initial value controller 550 and the error detection block 580 are separately constructed in this embodiment, the elements may be realized with a single controller.

Table 2 illustrates simulation results obtained by transmitting each of control information frames with a slot length of 1(2), 2(4), 4(255) and 4(0) 10,000 times in a noise-free state. Here, numerals in the parenthesis represent initial values of the CRC generator in decimal. In the simulation, the register initial value is set to N=2, for a control information frame with a 1-slot length. The register initial value is set to N2=4, for a control information frame with a 2-slot length. The register initial value is set to N3=255, for a control information frame with a 4-slot length corresponding to packet data with a 4-slot length. The register initial value is set to N4=0, for a control information frame with a 4-slot length corresponding to packet data with an 8-slot length. The result values obtained through the computer simulation include a successful detection probability Pd, a false probability Pfa, a mis-probability Pm, and an error probability Pe, the sum of the false probability Pfa and the mis-probability Pm. It is noted in Table 2 that the error probability Pe in detecting a control information frame comprised of 2(4) slots and 4(255) slots is extremely low when compared with the corresponding errors as shown in Table 1.

TABLE 2

| SPDCCH (CRC) | Pd | Pfa | Pm | Pe |
|---|---|---|---|---|
| 1(2) | 9.889e−01 | 0.000e+00 | 1.110e−02 | 1.110e−02 |
| 2(4) | 9.936e−01 | 0.000e+00 | 6.400e−03 | 6.400e−03 |
| 4(255) | 9.969e+00 | 0.000e+00 | 3.100e−03 | 3.100e−03 |
| 4(0) | 9.956e−01 | 0.000e+00 | 4.400e−03 | 4.400e−03 |

| SPDCCH (CRC) | CRC success | | | | Dedicated to other CRC symbols | | | |
|---|---|---|---|---|---|---|---|---|
| | 1(2) | 2(4) | 4(255) | 4(0) | 1(2) | 2(4) | 4(255) | 4(0) |
| 1(2) | 10000 | 36 | 37 | 38 | 0 | 36 | 37 | 38 |
| 2(4) | 45 | 10000 | 7 | 12 | 45 | 0 | 7 | 12 |
| 4(255) | 31 | 0 | 10000 | 0 | 31 | 0 | 0 | 0 |
| 4(0) | 44 | 0 | 0 | 10000 | 44 | 0 | 0 | 0 |

As described above, the mobile communication system for transmitting packet data sets different CRC generator register initial values not only in control information frames with the same length but also in control information frames with different lengths in transmitting and receiving signals on the packet data control channel, making it possible to solve a problem that an error is generated during reception of a control information frame by BSD.

While the invention has been shown and described with reference to a certain preferred embodiment thereof, it will be understood by those skilled in the art that various changes in form and details may be made therein without departing from the spirit and scope of the invention as defined by the appended claims. For example, the present invention has been described with reference only to a case where the packet data control channel transmitter of FIG. 1 encodes a 2-slot control information sequence for controlling 2-slot packet data at a coding rate R=¼ before transmission, and to another case where the packet data control channel transmitter encodes a 4-slot control information sequence for controlling 4-slot packet data at a coding rate R=¼ and performs symbol repetition the coded control information sequence before transmission. However, the present invention can also be applied to a packet data channel transmitter as well as the packet data control channel transmitter. That is, the present invention can be applied to a communication system which encodes first information with a first length at a predetermined coding rate before transmission, or encodes second information with a second length being F times (where, F is a multiple of 2) the first length at the predetermined coding rate before F-time repeated transmission.

What is claimed is:

1. An apparatus for generating an error detection information sequence for determining a length of data sequence transmitted, in a communication system which can transmit at least two data sequences with different lengths through a data channel, and transmit through a data control channel a control data sequence for each of the at least two data sequences, each of the control data sequences having a same length as the at least two data sequences, respectively, and including a control information sequence indicating information with regard to each of the at least two data sequences and an error detection information sequence for detecting an error of the control information sequence, the apparatus comprising:
  a plurality of cascaded registers, the number of the registers being equivalent to the number of bits in the error detection information sequence;
  a plurality of adders determined by a predetermined generator polynomial positioned between the registers, each of the adders adding a bit sequence received through an input path to a feedback bit sequence and outputting the addition result through an output path;
  an operator that,
    during reception of the control information sequence, generates the feedback bit sequence by sequentially adding bits of the control information sequence to output bits of a final register among the registers and provides the generated feedback bit sequence to the adders, and
    after completion of receiving the control information sequence, sequentially adds a preset input bit to output bits of the final register and outputs the addition result as the error detection information sequence; and
  an initial value controller for providing the registers with a selected one of two initial values separately determined for the two data sequences.

2. The apparatus of claim 1, wherein the operator comprises:
  a first switch for selectively outputting the control information sequence and the preset input bit;
  an output adder for adding an output of the first switch to output bits of the final register;
  a second switch for selectively providing an output of the output adder and the preset input bit as the feedback bit sequence to the adders; and
    a third switch for selectively outputting the control information sequence and the error detection information bit sequence from the output adder.

3. The apparatus of claim 2, wherein the first switch outputs the control information sequence during reception of the control information sequence, and outputs the preset input bit after completion of receiving the control information sequence.

4. The apparatus of claim 3, wherein the second switch provides an output of the output adder to the adders during reception of the control information sequence, and provides the preset input bit to the adders after completion of receiving the control information sequence.

5. The apparatus of claim 4, wherein the third switch outputs the control information sequence during reception of the control information sequence, and outputs the error detection information sequence after completion of receiving the control information sequence.

6. The apparatus of claim 1, wherein the at least two data sequences have different slot lengths.

7. The apparatus of claim 6, wherein one data sequence among the at least two data sequences is two times longer in slot length than the other data sequence.

8. An apparatus for generating a transmission information sequence by attaching an error detection information bit sequence to an input information sequence of a first information sequence or a second information sequence, in a communication system which encodes a first information sequence with a first length at a predetermined coding rate before transmission, and encodes a second information sequence with a second length being F times (where, F is a multiple of 2) the first length at the predetermined coding rate before F-time repeated transmission, the apparatus comprising:
  a plurality of cascaded registers, the number of the registers being equivalent to the number of bits in the error detection information sequence;
  a plurality of adders determined by a predetermined generator polynomial positioned between the registers, each of the adders adding a bit sequence received through an input path to a feedback bit sequence and outputting the addition result through an output path;
  an operator that,
    during reception of the input information sequence, generates the feedback bit sequence by sequentially adding bits of the input information sequence to output bits of a final register among the registers, provides the generated feedback bit sequence to the adders, and outputs the input information sequence as the transmission information sequence, and
    after completion of receiving the input information sequence, provides a preset input bit to the adders, sequentially adds the preset input bit to output bits of the final register to generate an error detection information bit sequence, and outputs the error detection information bit sequence as the transmission information sequence; and
  an initial value controller for providing the registers with a selected one of two initial values separately determined for the first information sequence and the second information sequence,
  wherein the input information sequence is a control information sequence of a packet data sequence, and the control information sequence and the packet data sequence have a same length.

9. The apparatus of claim 8, wherein the first information sequence is a control information sequence with a 2-slot length; and the second information sequence is a control information sequence with a 4-slot length.

10. The apparatus of claim 8, wherein the operator comprises:
  a first switch for selectively outputting the input information sequence and the preset input bit;
  an output adder for adding an output of the first switch to output bits of the final register;
  a second switch for selectively providing the adders with an output of the output adder and the preset input bit as the feedback bit sequence; and
  a third switch for selectively outputting the input information sequence and the output bits of the output adder as the transmission information sequence.

11. An apparatus for checking an error of a received control data sequence to detect a length of data sequences transmitted over a data channel, in a communication system including a transmitter which can transmit at least two data sequences with different lengths through the data channel and transmit through a data control channel a control data sequence for each of the at least two data sequences, each of the control data sequences having a same length as the at least two data sequences, respectively, and having a control information sequence indicating information with regard to each data sequence and an error detection information sequence for detecting an error in the control information sequence, and a receiver which receives data sequences transmitted over the data channel from the transmitter and a control data sequence transmitted over the data control channel from the transmitter, the apparatus comprising:
- a plurality of cascaded registers, a number of the registers being equivalent to a number of bits in the error detection information sequence;
- a plurality of adders determined by a predetermined generator polynomial positioned between the registers, each of the adders adding a bit sequence received through an input path to a feedback bit sequence and outputting the addition result through an output path;
- an operator that,
   during reception of the control information sequence, generates the feedback bit sequence by sequentially adding bits of the control information sequence to output bits of a final register among the registers and provides the generated feedback bit sequence to the adders, and
   after completion of receiving the control information sequence, sequentially adds a preset input bit to output bits of the final register and outputs the addition result as a received error detection information sequence;
- an initial value controller for providing the registers with a selected one of at least two initial values separately determined for the at least two data sequences; and
- an error decision block for comparing the received error detection information bit sequence with an error detection information bit sequence corresponding to the selected initial value, thus to determine existence of an error.

12. The apparatus of claim 11, wherein the operator comprises:
- a first switch for selectively outputting the control information sequence and the preset input bit;
- an output adder for adding an output of the first switch to output bits of the final register;
- a second switch for selectively providing the adders with an output of the output adder and the preset input bit as the feedback bit sequence; and
- a third switch for selectively outputting the received control information sequence and the received error detection information bit sequence from the output adder.

13. The apparatus of claim 11, wherein one data sequence among the at least two data sequences is two times longer in slot length than another data sequence.

14. The apparatus of claim 11, wherein the preset input bit has a value of "0."

15. An apparatus for checking an error of a received information sequence in a communication system including a transmitter which encodes a first information sequence with a first length at a predetermined coding rate before transmission, and encodes a second information sequence with a second length being F times (where, F is a multiple of 2) the first length at the predetermined coding rate before F-time repeated transmission, and attaches an error detection information sequence to the first information sequence or the second information sequence and transmits the result as a transmission information sequence, and a receiver which receives an information sequence from the transmitter, the apparatus comprising:
- a plurality of cascaded registers, the number of the registers being equivalent to the number of bits in the error detection information sequence;
- a plurality of adders determined by a predetermined generator polynomial positioned between the registers, each of the adders adding a bit sequence received through an input path to a feedback bit sequence and outputting the result through an output path;
- an operator that,
   during reception of the received information sequence, generates the feedback bit sequence by sequentially adding bits of the received information sequence to output bits of a final register among the registers, and provides the generated feedback bit sequence to the adders, and
   after completion of receiving the received information sequence, provides a preset input bit to the adders, sequentially adds the preset input bit to output bits of the final register and outputs the addition result as a received error detection information sequence;
- an initial value controller for providing the registers with a selected one of two initial values separately determined for the first information sequence and the second information sequence; and
- an error decision block for comparing the received error detection information sequence with an error detection information sequence corresponding to the selected initial value, to determine existence of an error, wherein the first information sequence is a control information sequence of a first packet data sequence, the second information sequence is a control information sequence of a second packet data sequence, the first control information sequence and the first packet data sequence have a same length, and the second control information sequence and the second packet data sequence have a same length.

16. The apparatus of claim 15, wherein the first information sequence has a 2-slot length; and the second information sequence has a 4-slot length.

17. A method for generating an error detection information sequence for determining whether at least two data sequences are transmitted in different lengths, in a communication system which can transmit the at least two data sequences with different lengths through a data channel, and transmit through a data control channel a control data sequence for each of the at least two data sequences, each of the control data sequences having a same length as the at least two data sequences, respectively, and including a control information sequence indicating information with regard to each data sequence and an error detection information sequence for detecting an error of the control information sequence, the method comprising the steps of:
- providing a plurality of cascaded registers, the number of the registers being equivalent to the number of bits in the error detection information bit sequence, and a plurality of adders determined by a predetermined generator polynomial positioned between the registers, each of the adders adding a bit sequence received through an input path to a feedback bit sequence and outputting the addition result through an output path;
- providing the registers with a selected one of at least two initial values separately determined for the at least two data sequences;
- during reception of the control information sequence, generating the feedback bit sequence by sequentially adding bits of the control information sequence to output bits of a final register among the registers and providing the generated feedback bit sequence to the adders;

after completion of receiving the control information sequence, sequentially adding a preset input bit to output bits of the final register and outputting the addition result as the error detection information bit sequence.

18. The method of claim 17, wherein one data sequence among the at least two data sequences is two times longer in slot length than another data sequence.

19. The method of claim 17, wherein the preset input bit has a value of "0."

20. A method for generating a transmission information sequence by attaching an error detection information sequence to an input information sequence of a first information sequence or a second information sequence, in a communication system which encodes a first information sequence with a first length at a predetermined coding rate before transmission, and encodes a second information sequence with a second length being F times (where, F is a multiple of 2) the first length at the predetermined coding rate before F-time repeated transmission, the method comprising the steps of:

providing a plurality of cascaded registers, the number of the registers being equivalent to the number of bits in the error detection information sequence, and a plurality of adders determined by a predetermined generator polynomial positioned between the registers, each of the adders adding a bit sequence received through an input path to a feedback bit sequence and outputting the result through an output path;

providing the registers with a selected one of two initial values separately determined for the first information sequence and the second information sequence;

during reception of the input information sequence, generating the feedback bit sequence by sequentially adding bits of the input information sequence to output bits of a final register among the registers, providing the generated feedback bit sequence to the adders, and outputting the input information sequence as the transmission information sequence; and after completion of receiving the input information sequence, providing a preset input bit to the adders, sequentially adding the preset input bit to output bits of the final register to generate an error detection information sequence, and outputting the error detection information bit sequence as the transmission information sequence, wherein the input information sequence is a control information sequence of a packet data sequence, and the control information sequence and the packet data sequence have a same length.

21. The method of claim 20, wherein the first information sequence is a control information sequence with a 2-slot length, and the second information sequence is a control information sequence with a 4-slot length.

22. The method of claim 20, wherein the preset input bit has a value of "0."

23. A method for checking an error of a received control data sequence to detect a length of data sequences transmitted over a data channel, in a communication system including a transmitter which can transmit at least two data sequences with different lengths through the data channel and transmit through a data control channel a control data sequence for each of the at least two data sequences, the control channel sequences having a same length as the at least two data sequences, respectively, and having a control information sequence indicating a data rate and a data transmission format of each data sequence and an error detection information sequence for detecting an error in the control information sequence, and a receiver which receives data sequences transmitted over the data channel from the transmitter and a control data sequence transmitted over the data control channel from the transmitter, the method comprising the steps of:

providing a plurality of cascaded registers, the number of the registers being equivalent to the number of bits in the error detection information sequence, and a plurality of adders determined by a predetermined generator polynomial positioned between the registers, each of the adders adding a bit sequence received through an input path to a feedback bit sequence and outputting the result through an output path;

providing the registers with a selected one of two initial values separately determined for the two data sequences;

during reception of the control information sequence included in the received control data sequence, generating the feedback bit sequence by sequentially adding bits of the control information sequence to output bits of a final register among the registers and providing the generated feedback bit sequence to the adders;

after completion of receiving the control information sequence, sequentially adding a preset input bit to output bits of the final register and outputting the addition result as a received error detection information sequence; and comparing the received error detection information sequence with an error detection information sequence corresponding to the selected initial value, thus to determine existence of an error.

24. The method of claim 23, wherein one data sequence among the at least two data sequences is two times longer in slot length than another data sequence.

25. The method of claim 23, wherein the preset input bit has a value of "0."

26. A method for checking an error of a received information sequence in a communication system including a transmitter which encodes a first information sequence with a first length at a predetermined coding rate before transmission, and encodes a second information sequence with a second length being F times (where, F is a multiple of 2) the first length at the predetermined coding rate before F-time repeated transmission, and attaches an error detection information sequence to the first information sequence or the second information sequence and transmits the result as a transmission information sequence, and a receiver which receives an information sequence from the transmitter, the method comprising the steps of:

providing a plurality of cascaded registers, the number of the registers being equivalent to the number of bits in the error detection information sequence, and a plurality of adders determined by a predetermined generator polynomial positioned between the registers, each of the adders adding a bit sequence received through an input path to a feedback bit sequence and outputting the result through an output path;

providing the registers with a selected one of two initial values separately determined for the first information sequence and the second information sequence;

during reception of the received information sequence, generating the feedback bit sequence by sequentially adding bits of the received information sequence to output bits of a final register among the registers, and providing the generated feedback bit sequence to the adders;

after completion of receiving the received information sequence, providing a preset input bit to the adders, sequentially adding the preset input bit to output bits of the final register and outputting the addition result as a received error detection information sequence; and comparing the received error detection information sequence with an error detection information sequence corresponding to the selected initial value, thus to determine existence of an error, wherein the first information sequence is a control information sequence of a first packet data sequence, the second information sequence is a control information sequence of a second packet data sequence, the first control information sequence and the first packet data sequence have a same length, and the second control information sequence and the second packet data sequence have a same length.

27. The method of claim 26, wherein the first information sequence has a 2-slot length, and the second information sequence has a 4-slot length.

28. The method of claim 26, wherein the preset input bit has a value of "0."

29. An apparatus for generating an error detection information sequence for determining a length of data sequence transmitted, in a communication system which can transmit at least two data sequences with different lengths through a data channel, and transmit through a data control channel a control data sequence, the control data sequence including a control information sequence indicating information with regard to each of the at least two data sequences and an error detection information sequence for detecting an error of the control information sequence, the apparatus comprising:

a plurality of cascaded registers, the number of the registers being equivalent to the number of bits in the error detection information sequence;

a plurality of adders determined by a predetermined generator polynomial positioned between the registers, each of the adders adding a bit sequence received through an input path to a feedback bit sequence and outputting the addition result through an output path;

an operator that,
during reception of the control information sequence, generates the feedback bit sequence by sequentially adding bits of the control information sequence to output bits of a final register among the registers and provides the generated feedback bit sequence to the adders, and after completion of receiving the control information sequence, sequentially adds a preset input bit to output bits of the final register and outputs the addition result as the error detection information sequence; and an initial value controller for separately determining a unique initial value for each different length data sequence, and providing the registers with a selected one of the at least two initial values separately determined for the at least two data sequences.

* * * * *